United States Patent [19]

Wieres et al.

[11] Patent Number: 5,618,501

[45] Date of Patent: Apr. 8, 1997

[54] CATALYTIC CONVERTER WITH TWO OR MORE HONEYCOMB BODIES IN A CASING TUBE AND METHOD FOR ITS PRODUCTION

[75] Inventors: Ludwig Wieres, Overath; Alfred Reck, Kürten, both of Germany

[73] Assignee: Emitec, Gesellschaft fuer Emissionstechnologie mbH, Lohmar, Germany

[21] Appl. No.: 463,700

[22] Filed: Jun. 5, 1995

Related U.S. Application Data

[63] Continuation of PCT/EP93/03057, Nov. 2, 1993, published as WO94/13939, Jun. 23, 1994.

[30] Foreign Application Priority Data

Dec. 9, 1992 [DE] Germany ............... 42 41 469.5

[51] Int. Cl.⁶ ............... B01D 53/34; F01N 3/10
[52] U.S. Cl. ............... 422/180; 422/171; 422/177; 422/211; 422/222
[58] Field of Search ............... 422/171, 177, 422/180, 211, 222; 502/439, 527; 55/DIG. 30; 60/299

[56] References Cited

U.S. PATENT DOCUMENTS

| | | | |
|---|---|---|---|
| 4,152,302 | 5/1979 | Nonnenmann et al. | 502/527 |
| 4,521,947 | 6/1985 | Nonnenmann et al. | 422/177 |
| 4,847,966 | 7/1989 | Kuchelmeister | 502/439 |
| 4,923,109 | 5/1990 | Cyron | 422/180 |
| 5,094,074 | 3/1992 | Nishizawa et al. | 422/180 |
| 5,096,111 | 3/1992 | Ishikawa et al. | 29/890 |
| 5,106,588 | 4/1992 | Sims et al. | 60/299 |
| 5,113,653 | 5/1992 | Usui et al. | 60/299 |
| 5,118,476 | 6/1992 | Dryer et al. | 422/180 |
| 5,118,477 | 6/1992 | Takikawa et al. | 422/180 |
| 5,403,559 | 4/1995 | Swars | 422/180 |

FOREIGN PATENT DOCUMENTS

| | | |
|---|---|---|
| 2214818 | 8/1974 | France . |
| 2302746 | 7/1974 | Germany . |
| 3939490 | 6/1990 | Germany . |
| 2020190 | 11/1979 | United Kingdom . |

Primary Examiner—Robert J. Warden
Assistant Examiner—Hien Tran
Attorney, Agent, or Firm—Herbert L. Lerner; Laurence A. Greenberg

[57] ABSTRACT

A catalytic converter includes a casing tube having a given internal diameter. At least two individual honeycomb bodies through which a fluid can flow in a given flow direction, are disposed in the casing tube. The honeycomb bodies are formed of structured metal layers forming flow channels. The layers are joined to the casing tube by joining techniques, such as hard brazing. The honeycomb bodies have a given theoretical strain-free diameter and have an internal layout making the honeycomb bodies elastic and permitting the honeycomb bodies to be inserted into the casing tube with an elastic compression of from 2 to 10% of the given theoretical strain-free diameter and with prestress. A method for producing a catalytic converter includes forming at least two honeycomb bodies with a given theoretical strain-free diameter from structured metal layers defining channels through which a fluid can flow in a given direction. The honeycomb bodies are subsequently successively or simultaneously inserted with prestress from at least one side into a prefabricated casing tube having a given internal diameter. The honeycomb bodies are elastically compressed by from 2 to 10% of the given theoretical strain-free diameter and/or at least partial regions of the casing tube are subsequently plastically compressed by from 2 to 10% of the given internal diameter. The layers are joined to the casing tube.

15 Claims, 4 Drawing Sheets

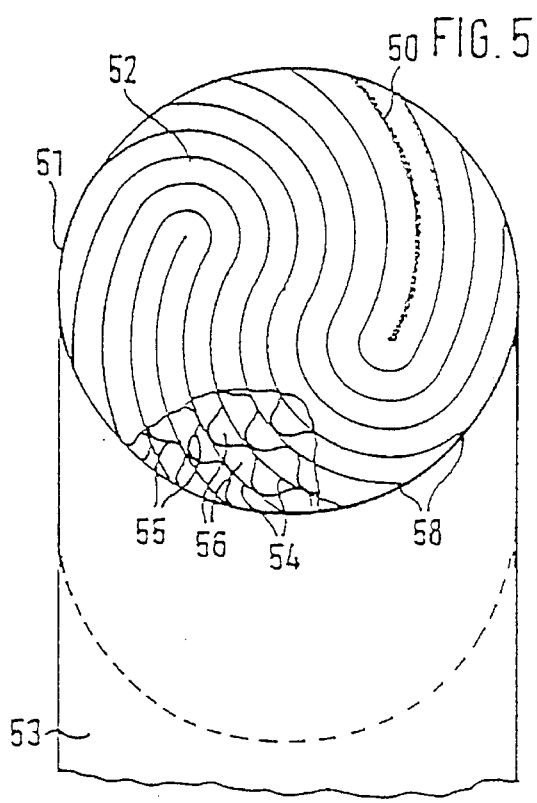
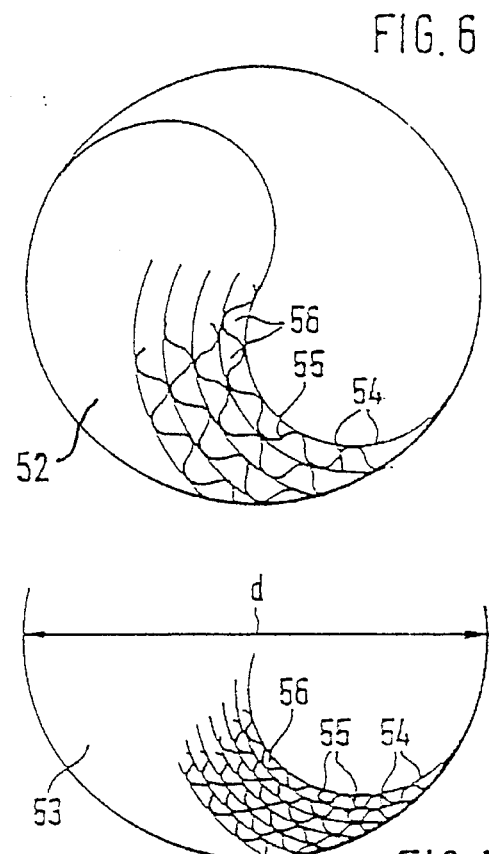
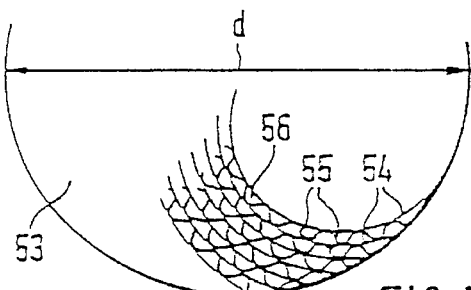
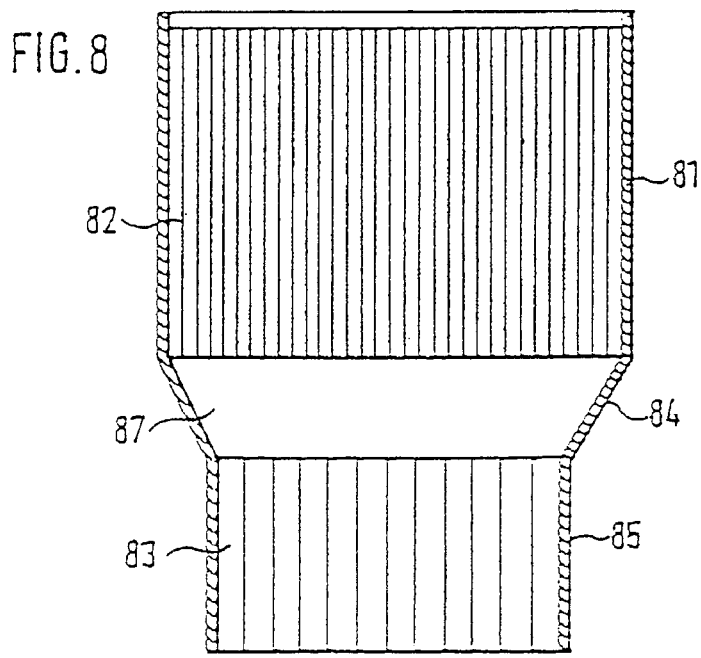

CATALYTIC CONVERTER WITH TWO OR MORE HONEYCOMB BODIES IN A CASING TUBE AND METHOD FOR ITS PRODUCTION

CROSS-REFERENCE TO RELATED APPLICATION

This application is a Continuation of International Application Serial No. PCT/EP93/03057, filed Nov. 2, 1993.

BACKGROUND OF THE INVENTION

1. Field of the Invention

The present invention relates to a catalytic converter having two or more honeycomb bodies disposed in a casing tube, and to a method for its production.

Catalytic converters are used in particular to clean exhaust gases of internal combustion engines and are used primarily in motor vehicles. In order to achieve a large surface area, such converters generally include one or more honeycomb bodies that have many channels through which an exhaust gas can flow. Since such honeycomb bodies cannot be produced monolithically with an arbitrarily great volume, it has long been known to dispose a plurality of such honeycomb bodies one after the other in a casing tube. An interstice or intermediate space remaining between such honeycomb bodies can bring about an additional mixing under some circumstances and therefore can achieve additional advantages.

Although two or more honeycomb bodies in a single casing tube are shown in a great number of references, such as German Published, Non-Prosecuted Application DE 39 39 490 A1, which is the point of departure for the present invention, nevertheless until now it was hardly a trivial problem to economically manufacture such catalytic converters on a large scale. For various reasons to be discussed in detail below, catalytic converters with two or more disks were therefore first assembled (usually welded) at the very end of the manufacturing and coating process, so that the advantages of an integrated production and only a single part could not be fully exploited.

One reason is that producing a catalytic converter requires relatively many manipulation steps. It is not only necessary for the honeycomb bodies to be inserted into a casing tube, but various steps are also needed for applying brazing material, brazing, and later coating. Typical spirally wound honeycomb bodies, of the kind described in German Published, Non-Prosecuted Application DE 39 39 490 A1, have a tendency when axially strained toward mutual displacement of the winding layers, known as telescopes, before they are finally brazed together. Axial forces must therefore be avoided during production. Moreover, brazing in an upright position is not possible, because the axial forces of gravity that then arise necessarily cause a shift in position. Accurate positioning of the honeycomb bodies in the casing tube is not easily possible, either. Honeycomb bodies wound spirally from smooth and corrugated sheet-metal layers are not very elastic, because the smooth sheet-metal layers extend virtually in a circle, and therefore the elastic forces to be brought to bear by such a honeycomb body are inadequate to absorb the axial forces that occur in high-speed production processes.

However, from the prior art, namely Published European Applications No. 0 430 945 B1 and No. 0 279 159 B1, other forms of honeycomb bodies are also known, which have increased elasticity because of their special construction.

Published European Application No. 0 454 712 B1 also discloses honeycomb bodies with microstructures that extend transversely to the flow and that besides influencing the flow also bring about hooking together of the foils, so that a kind of form-locking connection between the layers is created that prevents mutual shifting. A form-locking connection is one which connects two elements together due to the shape of the elements themselves, as opposed to a force-locking connection, which locks the elements together by force external to the elements.

SUMMARY OF THE INVENTION

It is accordingly an object of the invention to provide a catalytic converter with two or more honeycomb bodies in a casing tube and a method for its production, which overcome the hereinafore-mentioned disadvantages of the heretofore-known products and methods of this general type and which can be produced from the very outset with two or more honeycomb bodies in one casing tube, even under the conditions of high-speed, large-scale mass production.

With the foregoing and other objects in view there is provided, in accordance with the invention, a catalytic converter, comprising a casing tube having a given internal diameter; at least two individual honeycomb bodies through which a fluid can flow in a given flow direction, the honeycomb bodies being disposed in the casing tube; the honeycomb bodies being formed of structured metal layers forming flow channels, the layers being joined to the casing tube by joining techniques, such as hard brazing; and the honeycomb bodies having a given theoretical strain-free diameter and having an internal layout making the honeycomb bodies elastic and permitting the honeycomb bodies to be inserted into the casing tube with an elastic compression of from 2 to 10% of the given theoretical strain-free diameter and with prestress.

The invention assumes that the accelerations which occur in high-speed production processes and the later upright brazing of honeycomb bodies, which is desired for various technical and space reasons, are possibly only if the honeycomb bodies are entirely fixed in a casting tube by considerable elastic forces, and if the individual sheet-metal layers can no longer shift among one another. In order to bring such high elastic forces to bear, the honeycomb bodies must be compressed by at least two and up to 10% of their theoretical strain-free diameter. The theoretical strain-free diameter is understood to mean the diameter that the honeycomb body would assume upon being densely wound or laminated, because of the structures of its metal sheets or layers, if no compressive forces are exerted upon it. Naturally, a honeycomb body can already be deformed during production by exerting compressive forces, so that during the production process it never actually assumes this theoretical strain-free diameter. It is important, however, that due to its construction the honeycomb body will in fact permit elastic compressions on this order of magnitude. To that end, either the more-elastic constructions known from the prior art or special corrugation forms for the individual layers must be used. Honeycomb bodies that include many metal sheets or layers being intertwined with one another, or honeycomb bodies in which sheet-metal layers of differing corrugation but no spiral, smooth sheet-metal layers, are used, are specially suitable for these purposes. The elastic forces thus attained are even sufficient for a residual elasticity to be attained in a high-temperature vacuum brazing process which is high enough to ensure that the honeycomb bodies can be brazed while standing upright. Although some of the elastic deformation in this brazing process can change into plastic deformation, nevertheless some residual elasticity always remains, which prevents the honeycomb bodies and layers from shifting relative to one another during the vibration-free brazing process. While it has already been possible to braze individual honeycomb bodies disposed in a casing tube in an upright position, since the honeycomb bodies can be supported from beneath, this problem can only be solved when there are two or more honeycomb bodies in a casing tube by using sufficiently high fixation forces, since not all of the honeycomb bodies can be supported simultaneously from below.

In accordance with another feature of the invention, the effect brought about by the elastic forces is additionally reinforced by certain constructions or internal form-locking connections. Internal form-locking connections in particular prevent axial shifting of spirally wound layers, in which such shifting otherwise especially occurs. The use of metal sheets or layers wound in an S or of honeycomb bodies with many otherwise intertwined sheets or layers also helps to avoid axial shifting of the layers, since the sheets or layers are relatively short and rest by their ends on the casing tube, so that the shifting is prevented by considerably higher forces of friction.

In accordance with a further feature of the invention, the frictional forces are maximized by a suitable pairing of materials for the casing tube and the honeycomb bodies. Not only the surface properties of the materials but above all their coefficients of thermal expansion play a role in that case. Although the casing tube expands very much more than the honeycomb bodies during a heat treatment or during the brazing process, the forces of friction abate in the process and undesired shifting occurs.

In accordance with an added feature of the invention, although austenitic special steels are very often used for the casing tube for metal honeycomb bodies, for the present invention it is advantageous to use ferritic corrosion-resistant special steel, especially steel identified by material numbers 1.4509 (ASTM 441) or 1.4512 (AISI 409).

In accordance with an additional feature of the invention, even for catalytic converters with a plurality of honeycomb bodies, the present invention makes it possible to use one-piece casing tubes, particularly without any round weld seam between the honeycomb bodies.

In accordance with yet another feature of the invention, in principle, all of the advantages of the invention can be utilized if the casing tube is graduated as well and if the individual honeycomb bodies have different diameters.

In accordance with yet a further feature of the invention, the fixation and dimensionally accurate placement of the honeycomb bodies in a casing tube is reinforced by internal beads, which serve as a stop when the honeycomb bodies are inserted and as a mount in the further production steps. It is entirely possible to compress a honeycomb body so far that it can be thrust past an internal bead and then expand again somewhat behind it. For many applications, however, it is possible to dispense entirely with the additional provision of internal beads.

In accordance with yet an added feature of the invention, all of the provisions described above may be employed unchanged if the honeycomb bodies have different numbers of flow channels per unit of cross-sectional area. They can also be employed for honeycomb bodies with a different number of flow channels per unit of cross-sectional area distributed over the flow cross section.

In accordance with yet an additional feature of the invention, it is also important that joint coating of a plurality of honeycomb bodies in one casing tube be possible. The lack of experience in this area is probably one reason why thus-produced catalytic converters have thus far not gained large-scale industrial use. It had initially been suspected that in coating with ceramic material, which is generally performed by sprinkling with a slurry of ceramic particles, difficulties could arise because relatively large droplets could form in the upper honeycomb body and would then plug the lower honeycomb body. In fact, however, and as described in further detail below, it has been found that while meeting certain peripheral conditions, uniform coating with ceramic and catalytically active material even of a plurality of honeycomb bodies in one casing tube is possible in a single operation.

With the objects of the invention in view, there is also provided a method for producing a catalytic converter, which comprises forming at least two honeycomb bodies with a given theoretical strain-free diameter from structured metal layers defining channels through which a fluid can flow in a given direction; subsequently inserting the honeycomb bodies successively or simultaneously with prestress from at least one side into a prefabricated casing tube having a given internal diameter; elastically compressing the honeycomb bodies by from 2 to 10% of the given theoretical strain-free diameter and/or subsequently plastically compressing at least partial regions of the casing tube by from 2 to 10% of the given internal diameter; and joining the layers to the casing tube.

In principle it makes no difference whether an elastically compressed honeycomb body is introduced into an unchanged casing tube, or whether the initially slight elastic deformation of an honeycomb body is increased after insertion into the casing tube by plastic deformation of a casting tube.

Combinations of these two variants are also possible. In summary, once again, at least one prestress must be created that is equivalent to a compression by from 2 to 10% of the theoretical strain-free diameter of the honeycomb body.

In accordance with another mode of the invention, in order to ensure that the honeycomb bodies can later be firmly brazed to the casing tube, it is advantageous to provide the casing tube with brazing powder on the inside, at least in some regions, before the honeycomb body is inserted or introduced, which is a provision that is known per se.

In accordance with a further mode of the invention, in a known manner, the outer end surfaces of the honeycomb body are acted upon by brazing powder after they have been introduced or inserted into the casing tube. However, other methods for applying the brazing powder before or during the winding of the honeycomb bodies are also possible.

In accordance with an added mode of the invention, in order to increase the mechanical strength of the entire configuration and to additionally fix the honeycomb bodies, internal beads are pressed before or after the honeycomb bodies have been introduced or inserted into the casing tube. These beads may serve as a stop and/or as a positionally accurate fastening for the honeycomb bodies.

In accordance with an additional mode of the invention, the former method steps assure that the prestressing of the honeycomb body is even adequate for fixation during a high-temperature vacuum brazing process. The honeycomb bodies can therefore be brazed in an upright position in a brazing furnace, which in addition to saving space has other technical advantages. First, a more-uniform distribution of brazing material in the circumferential direction is attained, because the brazing material in the liquid state cannot converge on one side of the honeycomb body, and on the other deformation is avoided. The upright position can also have advantages for the sake of evacuating the furnace.

Even when coating is performed subsequently, the upright position is especially advantageous, for similar reasons. In accordance with yet another mode of the invention, in order to coat with a ceramic composition, the honeycomb bodies are sprinkled from above with a slurry of ceramic particles. As long as the slurried ceramic particles are considerably smaller in their particle size than the diameter of the channels, coating of a plurality of honeycomb bodies located one below the other is possible without difficulty.

In accordance with yet a further mode of the invention, in honeycomb bodies with a varying number of flow channels per unit of cross-sectional area, the honeycomb body having the least number of flow channels per unit of cross-sectional area is disposed at the top, so that it is sprinkled by the slurry first. In that case, the distribution of the slurry is not substantially altered, nor do any relatively large droplets form that could plug up channels located at a lower level in a second honeycomb body.

In accordance with a concomitant mode of the invention, in the case of graduated casing tubes with honeycomb bodies of varying cross section, it is recommended that the honeycomb body having the largest cross section be sprinkled from above, because this assures that the smaller honeycomb body located at a lower level will also be completely coated, which could not be attained without difficulty if the configuration were reversed.

Other features which are considered as characteristic for the invention are set forth in the appended claims.

Although the invention is illustrated and described herein as embodied in a catalytic converter with two or more honeycomb bodies in a casing tube and a method for its production, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 5, 6 and 7 are fragmentary perspective and end-elevational views of a different configuration of a catalytic converter with two honeycomb bodies; and FIG. 8 is a cross-sectional view of a catalytic converter having two honeycomb bodies of differing diameter.

DESCRIPTION OF THE PREFERRED EMBODIMENTS

Figure 1:
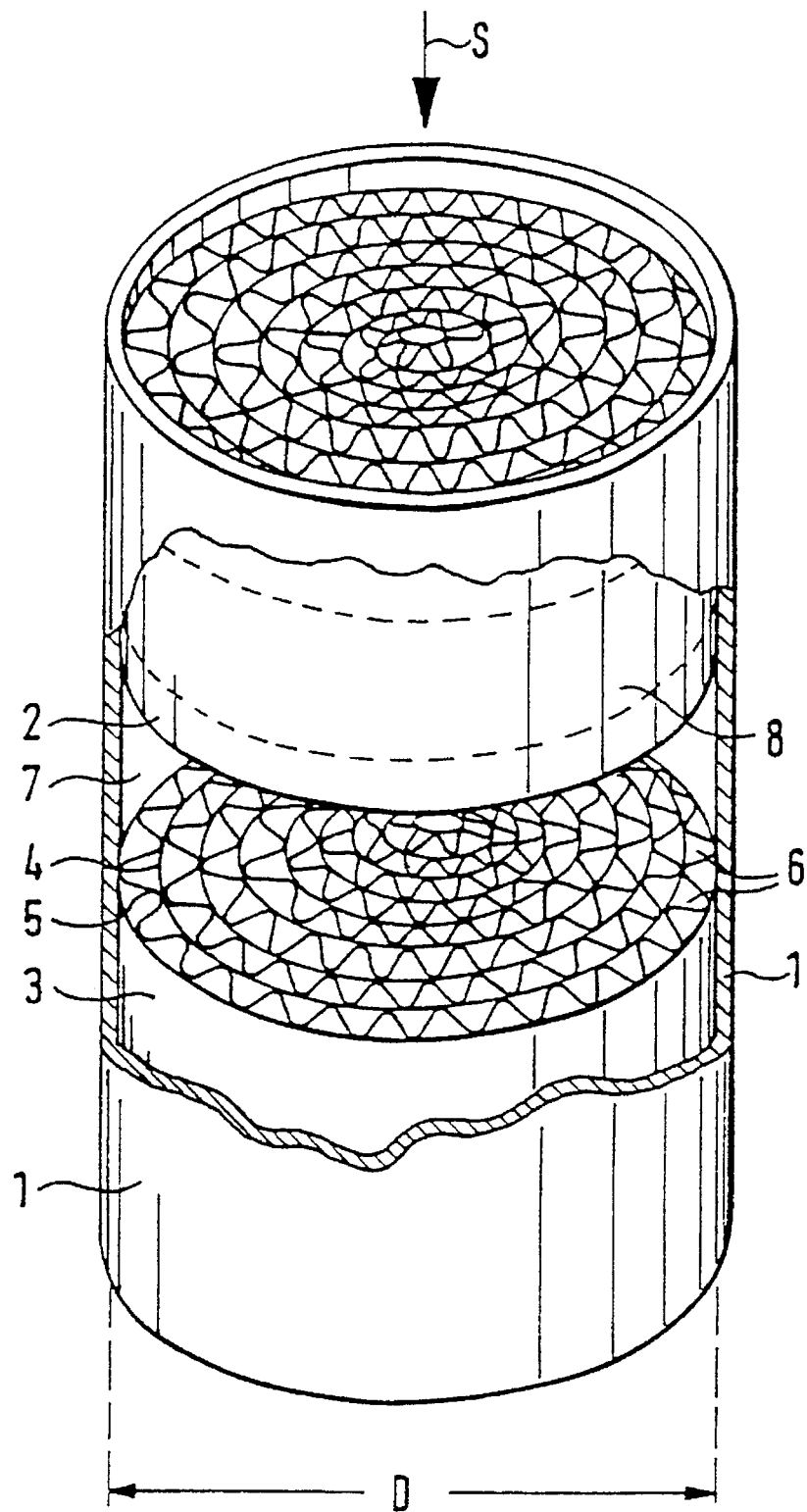
FIG. 1 is a partly broken-away, diagrammatic, perspective view of a catalytic converter having two honeycomb bodies disposed in a casing tube.

Referring now to the figures of the drawing in detail and first, particularly, to FIG. 1 thereof, there is seen a catalytic converter which includes a casing or jacket tube 1 with an internal diameter D, into which two honeycomb bodies 2, 3 are inserted. Both honeycomb bodies include alternating layers of smooth metal sheets or layers 4 and corrugated metal sheets or layers 5, which form many flow channels 6 through which a fluid can flow in a flow direction S. An interstice or intermediate space 7 is free between the honeycomb bodies 2, 3. As is suggested by dashed lines for the honeycomb body 2, this body may be brazed to the casing tube 1 in a specific circumferential zone 8. The same is naturally true for the honeycomb body 3. The honeycomb bodies 2, 3, which are shown as being spirally wound for the sake of simplicity in FIG. 1, must be given a structure of their sheet-metal layers 4, 5, or an internal layout, in such a way that they are especially elastic. The elasticity must be at least great enough to ensure that an initial stress-free or prestress-free wound body can be so severely elastically deformed that its diameter decreases by 2 to 10%. A diameter d of the honeycomb bodies 2, 3 that would be established outside the casing tube 1 in the strain-free state, as is shown in FIG. 2, would therefore be correspondingly greater than the internal diameter D of the casing tube 1.

Figure 2:
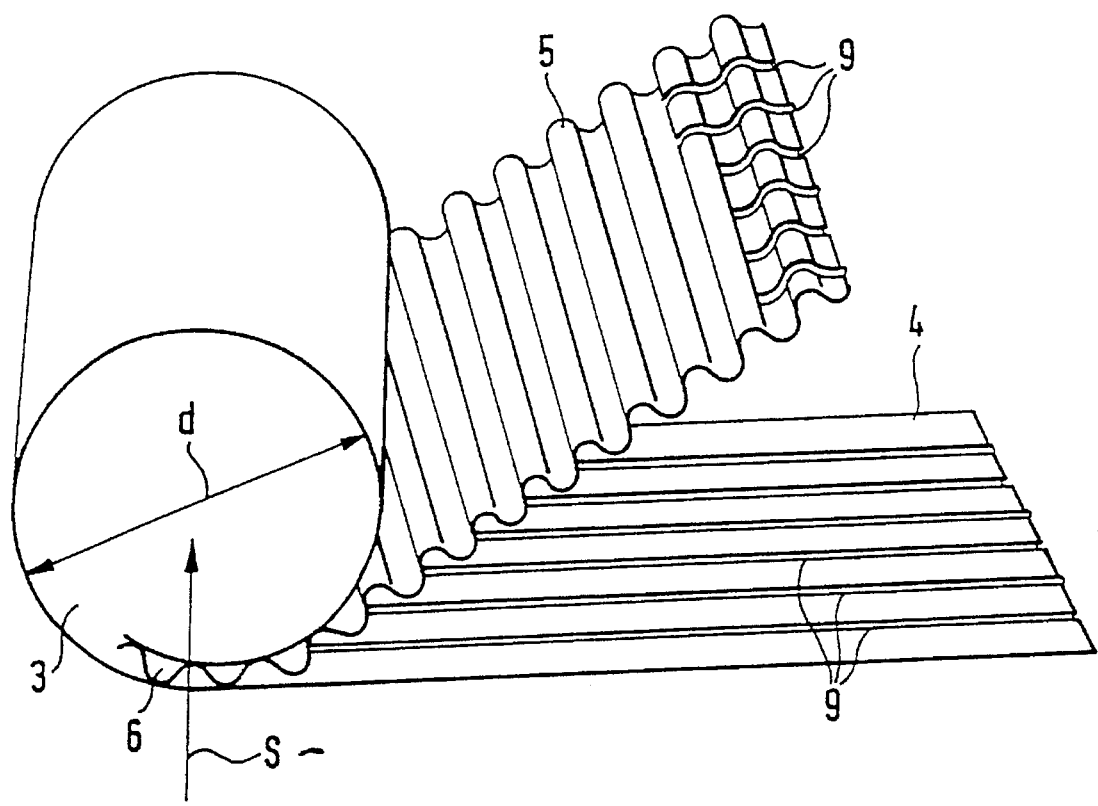
FIG. 2 is a perspective view illustrating production of a honeycomb body having microstructures, extending transversely to a flow direction.

FIG. 2 shows the basic layout of a spirally wound honeycomb body 3, which in the present case includes a primarily smooth sheet or layer 4 and a corrugated sheet or layer 5. In the case of the present invention, the use of two markedly differently corrugated sheet-metal layers would be even more advantageous, because it would produce more-elastic bodies. In order to additionally prevent slippage of the layers of the wound body in the axial direction, microstructures 9 may be provided transversely to the flow direction S in all of the sheet-metal layers. These microstructures catch in one another and as a result form form-locking connections, which increase the stability of the entire body. Such microstructures 9 are also advantageous for influencing the flow in the channels 6 of the honeycomb body. As mentioned above, the diameter d of the honeycomb body 3 is suggested in FIG. 2. The microstructures have a height of up to 200 μm in the preferred embodiment.

Figure 3:
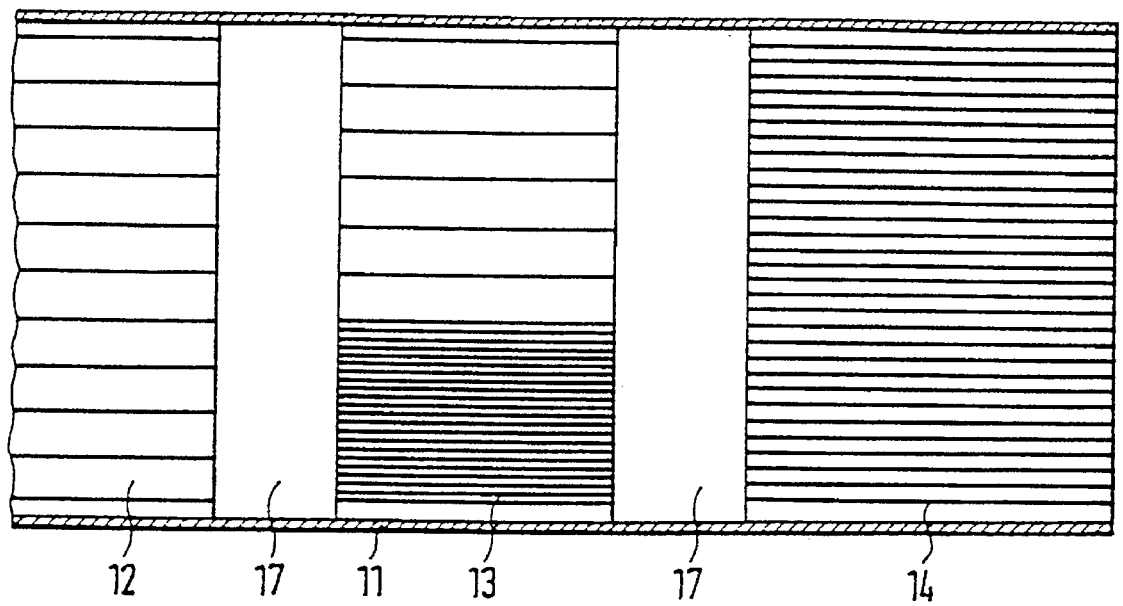
FIG. 3 is a cross-sectional view of a casing tube having three honeycomb bodies with a varying number of cells per unit of cross-sectional area.

The diagrammatic cross section of FIG. 3 shows a casing tube 11, in which three honeycomb bodies 12, 13, 14 having a differing number of flow channels per unit of cross-sectional area, are disposed. Interstices or intermediate spaces 17 remain free between the honeycomb bodies 12, 13, 14. Such honeycomb bodies can be especially economically manufactured on a large scale in accordance with the present invention.

Specific requirements for volume and the number of flow channels per unit of cross-sectional area in the various honeycomb bodies 12, 13, 14 can be flexibly adapted to given application conditions.

Figure 4:
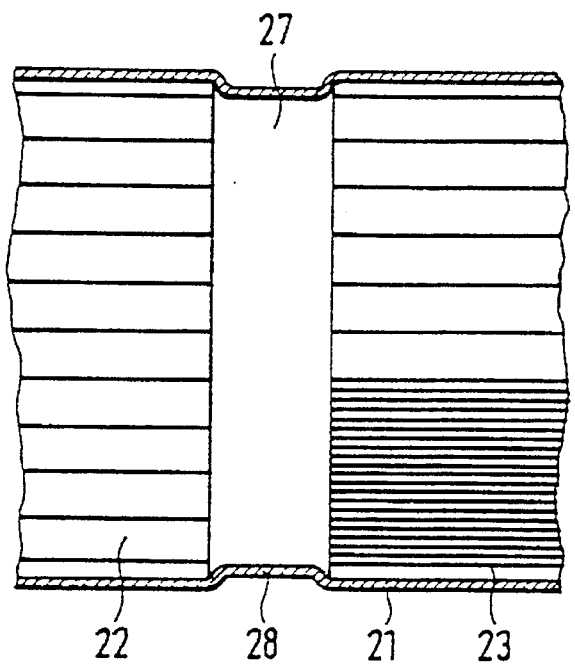
FIG. 4 is a fragmentary, cross-sectional view of a casing tube having an internal bead for additional fixation of two honeycomb bodies.

FIG. 4 shows a way in which an additional fixation for honeycomb bodies 22, 23 can be created by means of internal beads 28 in a casing tube 21. An interstice or intermediate space 27 is free between the honeycombe bodies 22, 23. In the example shown, the internal bead 28 serves as a stop for the honeycomb bodies which are inserted from their end surfaces. Particularly dimensionally accurate production is facilitated thereby. However, identical internal beads on the end surfaces may also serve to fix the honeycomb bodies. Upon insertion, the honeycomb body must then be compressed so severely, that it fits past the internal bead and expands again somewhat after the internal bead. It is also possible for internal beads not to be made until after the insertion of the honeycomb bodies 22, 23 into the casing tube 21.

FIGS. 5, 6 and 7 diagrammatically show a different possible layout for a catalytic converter including honeycomb bodies 52, 53 with sheet-metal layers 54, 55 intertwined in an S shape. Once again, these layers form many flow channels 56. FIG. 6 shows the honeycomb body 52 with a lesser number of flow channels 56 per unit of cross-sectional area. FIG. 7 shows that the honeycomb body 53, which is merely shown in dashed lines in FIG. 5, has a greater number of flow channels per unit of cross-sectional area. The theoretical strain-free diameter d of the honeycomb body 53 is also suggested in FIG. 7. A coating 50 to be applied to the individual sheet-metal layers 54, 55 is likewise diagrammatically suggested in FIG. 5.

FIG. 8 shows a further exemplary embodiment of a catalytic converter, which includes a first honeycomb body 83 that has a smaller diameter than a second honeycomb body 82. Both honeycomb bodies 82, 83 are accommodated in a casing tube, which includes one segment 81 of large diameter, one conical segment 84, and one segment 85 of smaller diameter. The conical segment 84 has a free intermediate space 87.

Catalytic converters which are constructed and produced according to the invention are especially suitable for economical large-scale mass production, which is especially desirable for use in motor vehicles. Most known models, and many features known for improving such honeycomb bodies, can be employed without difficulty in the catalytic converters according to the invention as well.

We claim:

1. A catalytic converter, comprising:

a casing tube having a given internal diameter;

at least two individual honeycomb bodies through which a fluid can flow in a given flow direction, said honeycomb bodies being disposed in said casing tube;

said honeycomb bodies being formed of structured metal layers forming flow channels, said layers being joined to said casing tube by hard brazing; and said honeycomb bodies having a given theoretical strain-free diameter and having an elastic compression capacity of from 2 to 10% of said given theoretical strain-free diameter for prestress.

2. The catalytic converter according to claim 1, wherein said honeycomb bodies have a structural form hindering axial shifting of said layers relative to one another.

3. The catalytic converter according to claim 1, wherein said honeycomb bodies have internal form-locking connections hindering axial shifting of said layers relative to one another.

4. The catalytic converter according to claim 1, wherein said casing tube is formed with one material and said layers are formed with another material for maximizing friction between said casing tube and said layers.

5. The catalytic converter according to claim 4, wherein said casing tube includes ferritic corrosion-proof special steel.

6. The catalytic converter according to claim 5, wherein said special steel is selected from steels having material numbers 1.4509 (ASTM 441) and 1.4512 (AISI 409).

7. The catalytic converter according to claim 1, wherein said structured metal layers include many individual metal layers being intertwined with one another and each having ends being secured to said casing tube.

8. The catalytic converter according to claim 1, wherein said honeycomb bodies include at least two types of differently corrugated layers.

9. The catalytic converter according to claim 8, wherein said differently corrugated layers are wound spirally.

10. The catalytic converter according to claim 1, wherein said layers have microstructures extending transversely or obliquely relative to said given flow direction with a height of up to 200 μm, for creating form-locking connections between said layers.

11. The catalytic converter according to claim 1, wherein said casing tube is constructed in one piece without a round weld seam, between said honeycomb bodies.

12. The catalytic converter according to claim 1, wherein said casing tube is graduated and has different diameters for said individual honeycomb bodies.

13. The catalytic converter according to claim 1, wherein said casing tube has internal beads fixing positions of said honeycomb bodies.

14. The catalytic converter according to claim 1, wherein said honeycomb bodies have different numbers of flow channels per unit of cross-sectional area.

15. The catalytic converter according to claim 1, wherein said honeycomb bodies in said casing tube are coated with a ceramic composition and with catalytically active material in a single operation.

* * * * *